Oct. 8, 1957
O. E. CARLSON
2,809,338
CONSTANT HORSEPOWER MOTOR CONTROL AND INDICATING CIRCUITS
Filed April 13, 1956
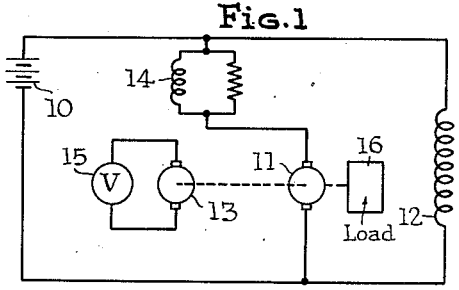
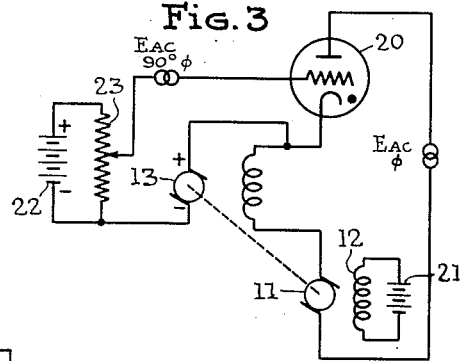
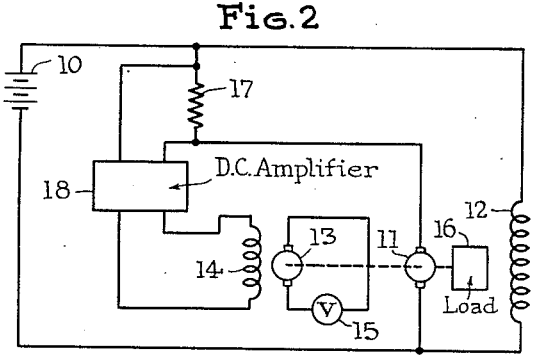
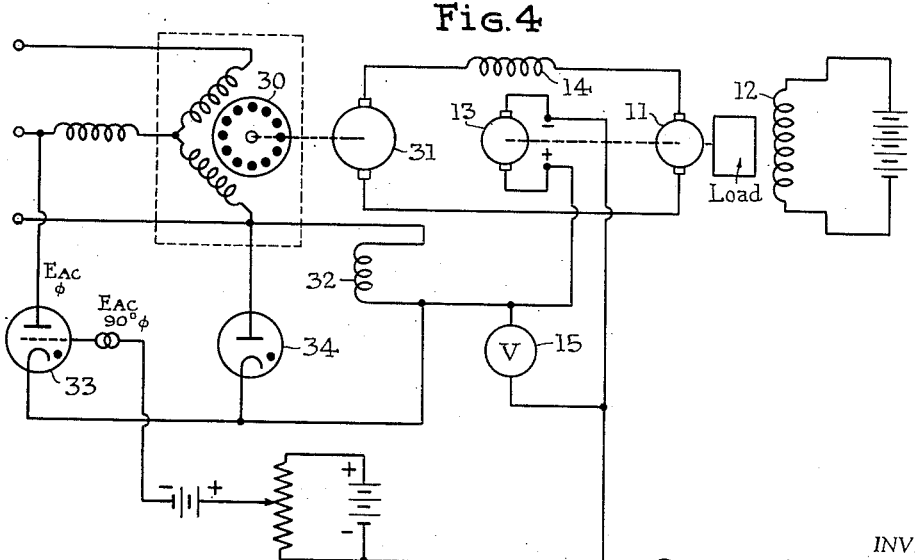
INVENTOR
Oscar E. Carlson
BY Kenyon and Palmer
ATTORNEYS 2,809,338

CONSTANT HORSEPOWER MOTOR CONTROL
AND INDICATING CIRCUITS

Oscar E. Carlson, Paterson, N. J.

Application April 13, 1956, Serial No. 577,965

8 Claims. (Cl. 318—308)

This invention relates to electronic motor control and power indicating systems, and more particularly to those systems of motor control which maintain a constant horsepower output from a direct current motor under varying load conditions and circuits which will indicate the horsepower delivered at any given time.

The present application is a continuation-in-part of my copending application Serial No. 479,007, now abandoned, filed December 31, 1954. There are many industrial applications which require that the speed of a motor be varied in inverse proportion to the torque required to drive the motor load. Such applications are often referred to as "constant horsepower," and a variety of systems have been proposed heretofore for accomplishing this result. Perhaps the largest field of application of this type of control lies in operations where in sheet material, for example, is wound onto a wind-up roll at a constant linear speed. In such cases, the motor which drives the wind-up roll must reduce its speed as the radius of the wind-up roll increases, and such reduction in speed must be directly proportional to the radius buildup in order to maintain constant linear speed of the material being wound. One prior art system proposes the use of a so-called "dancer roll" connected to a transducer, the output of which is applied to the motor control system to maintain constant linear speed of the material being wound. This system finds principal application where material coming from a process is wound up on a storage roll. Another prior art system involves the use of a measuring roll which is contacted by the material being wound, and the speed of which is, therefore, proportional to the linear speed of the traveling web. A tachometer generator, driven directly by the measuring roll, can then be used to provide a signal voltage for maintaining constant linear speed of the material being wound. Both of these systems enjoy substantial commercial use at the present time, but both have limitations which are avoided through use of the present invention.

There are many industrial wind-up or take-off systems in which it is highly undesirable to have physical contact between the material being wound and any type of dancer roll, measuring roll or the like. The present invention is admirably suited to such applications, but is not limited thereto.

Before proceeding with a detailed description of the present invention, observation of a few basic considerations are in order. If we consider a D. C. motor; horsepower delivered by the motor shaft is proportional to the product of torque and speed of the shaft. Mechanical power taken from the shaft must, therefore, be equal to the electrical power applied to the armature, minus the power losses in the armature itself. The power off in watts, therefore, would be equal to the generated armature voltage or back E. M. F. in watts multiplied by the armature current in amperes. In D. C. motors, the speed of rotation is proportional to the generated voltage, and the current drawn by the armature is proportional to the torque or load on the motor. Therefore, if a system can be provided which will automatically multiply the generated voltage by the armature current, the product will be proportional to motor horsepower. While such multiplication can be performed electronically, this is a difficult proposition requiring complex circuitry. However, a simple solution is offered in accordance with the present invention.

The speed of a motor is proportional to its generated voltage and we can drive a small generator directly from the motor shaft with the result that the speed of the generator shaft is then proportional to the voltage generated by the motor armature. If we then excite the generator field winding with the motor armature current, or with a current which is proportional to the motor armature current, then the generator output voltage will be proportional to the horsepower output of the motor. The generation of such a horsepower proportional voltage gives rise to a number of utilizations of this voltage. For example, the voltage can be used to control the motor in such a way that constant horsepower is delivered to varying loads and/or the voltage may be used to indicate the horsepower delivered to a given load.

To restate the basic concept in somewhat different terms, motor speed is directly proportional to back E. M. F. or generated armature voltage and not to the applied voltage. The back E. M. F. is equal to the applied voltage minus IR drop in the armature. Thus, the D. C. generator functions according to this invention as a horsepower transducer and multiplies the speed and armature current directly. It should be further noted that a D. C. generator used in this manner is self-compensating for the variable losses due to IR drop under varying loads. The other losses which are inherent in motors, namely windage, eddy current and friction, are small in well-designed motors and need not be compensated for in most instances. In unusual circumstances, requiring compensation for these other losses, compensation can be effected by adding a voltage to the field excitation of the generator which is proportional to the increasing losses due to windage, etc., at higher speeds. Such compensation methods could be introduced in a variety of ways, none of which are pertinent to the disclosure of the basic invention.

Referring now to the attached sheet of drawings for a complete disclosure of the present invention, Fig. 1 shows a schematic diagram of substantially minimum circuitry necessary to illustrate a horsepower indicating circuit in accordance with this invention.

Fig. 2 is a diagram similar to that of Fig. 1, but in which the armature current is passed through a resistor connected in series with the armature and the voltage appearing across this resistor is amplified and then applied to the field winding of the D. C. generator.

Fig. 3 is a schematic wiring diagram of a basic motor control circuit in which the motor delivers constant horsepower under varying load conditions.

Fig. 4 shows a schematic wiring diagram of a motor generator set in which the same basic principles of the circuit shown in Fig. 3 are employed to achieve constant horsepower characteristics of the motor being controlled.

Referring first to Fig. 1, there is shown a source of voltage 10 connected to the armature 11 of a direct current motor. The field winding 12 of the motor is shown connected to the same source but separate field excitation would serve equally well. A D. C. generator 13 is mechanically coupled to the motor and the field winding 14 of the generator 13 is connected in series between the D. C. motor armature 11 and the source 10. Connected across the output terminals of the D. C.

generator is a meter 15 which is used to indicate the horsepower which the motor is delivering at any time to the load 16, which is also coupled to the D. C. motor shaft. Obviously, the meter 15 should be of a high impedance type in order not to overload the D. C. generator 13, as this could cause erroneous horsepower readings. Conveniently, the meter may be voltmeter of the vacuum tube type, calibrated however, to read directly in horsepower.

Referring now to Fig. 2, the same basic circuitry is involved with only one minor change. Instead of connecting the field winding 14 of the D. C. generator directly in series with the armature of the D. C. motor, a resistor 17 is connected in series with the armature 11 of the D. C. motor, and the voltage developed across this resistor due to armature current in the motor is amplified at 18 and then applied to the field winding 14 of the D. C. generator. Obviously, with proper calibration of the various components, the current through the field winding of the D. C. generator need only be proportional to and not necessarily equal to the current through the armature of the motor. Likewise, the coupling between the motor armature and generator armature shafts need not be direct in the sense that both are connected to the same shaft, but gearing of any known type may be interposed. The only requirement is that one be rotating in a known proportion to the speed of the other. The use of the series resistor 17 in Fig. 2 permits testing or horsepower indicating for larger size D. C. motors with the same size tachometer generator than would be practical where the field winding of the generator and the motor armature are connected directly in series. As will be apparent to those skilled in the art, the D. C. generator employed in circuits of this type may be quite small and of low current capacity by comparison with the motor which drives it.

Referring now to Fig. 3 of the attached drawings, a conventional thyratron 20 is shown connected to supply voltage from an A. C. line to the armature 11 of the D. C. motor. The field winding 12 of the motor may be excited in any desired fashion, and for illustrative purposes, such excitation is shown in the drawing as a battery 21.

The field winding 14 of the generator is connected in series between the motor armature 11 and the cathode of the thyratron 20. The motor armature current and the D. C. generator field current, therefore, are one and the same.

The generator 13 is mechanically coupled to the shaft of the motor armature 11 so that the generator shaft speed is directly proportional to the motor speed, and, therefore, is directly proportional to the motor generated voltage or back E. M. F.

As is conventional in thyratron motor control systems, a phase-shifted alternating current voltage is applied to the grid of the thyratron 20. Such voltage is conventionally substantially 90° out of phase with the anode voltage. To complete the grid to cathode circuit, the positive side of the generator 13 is connected to the cathode of the thyratron 20 and the negative side of the generator is connected through a D. C. reference voltage and in series with the phase-shifted A. C. voltage to the thyratron grid. In the drawing, the D. C. reference voltage is symbolized by a battery 22 and potentiometer 23. Adjustment of the reference voltage by means of the potentiometer provides a means for varying the base horsepower setting of the circuit.

While the D. C. reference voltage as shown in the drawing, is merely symbolic, it will be understood that the battery and potentiometer combination may be replaced with a voltage generator of any known type. For example, a D. C. generator could be used and could be so coupled to the prime mover for a given process that the motor control system would continue to provide constant horsepower automatically, regardless of the changes in the speed of the prime mover, changing the over-all process speed.

Referring now to Fig. 4 of the drawings, there is shown a schematic diagram of a slightly different constant horsepower motor control circuit. In this instance, the thyratron supply for the motor armature circuit as shown in Fig. 3 has been replaced by a conventional A. C.-D. C. motor generator set. The motor 30 is shown as having a three-phase stator winding and the motor shaft is directly coupled to a direct current generator 31. The output voltage of generator 31 is applied to the armature 11 of the motor whose horsepower output is to be maintained constant. As in all of the previous figures in the drawing, the tachometer generator armature 13 is mechanically coupled to the shaft of the motor armature 11 and its field winding 14 is placed in series circuit relation with the armature 11 of the motor to be controlled. The field winding 32 of the generator of the motor generator set is supplied with D. C. voltage from the same A. C. lines which feed the A. C. drive motor 30 by connecting it in a rectifier circuit which includes a thyratron 33 and a gaseous diode 34. In this circuit, the diode 34 becomes conducting on current decay in the field 32 of the generator so as to prevent high peak inverse voltage from being applied to the thyratron 33 during the non-conductive portion of its cycle. The action of the diode, therefore, is such as to cause a substantially continuous current of a unidirectional nature through the field winding 32 of the generator of the motor generator set. The output voltage of the tachometer generator is used in a feed back loop in the grid circuit of the thyratron 33. This circuit is in most respects similar to that shown in the grid circuit of the thyratron in Fig. 3. It includes a phase-shifted A. C. voltage and a D. C. reference voltage, as well as a still further voltage used as a hold-off bias for the thyratron. As in Figs. 1 to 3, inclusive, a horsepower indicating meter 15 is also connected to the output voltage terminals of the tachometer generator. The field winding 12 of the motor being controlled must, of course, be excited, and excitation is shown schematically in the drawing as a battery.

As discussed with reference to Fig. 3, the reference voltage in the grid circuit of the thyratron may readily be replaced by a D. C. generator mechanically coupled to the prime mover of a given process in order that the reference voltage may change automatically in accordance with the requirements of the process. In this way, the circuit shown in Fig. 4, as well as the one shown in Fig. 3, may be made to run at a constant horsepower, as dictated by a changing basic horsepower reference voltage.

A detailed description of the operation of each of the circuits shown in Figures 1–4 is not believed necessary since the operation is apparent from the initial discussion of the basic considerations involved followed by detailed description of each of the circuits shown. Suffice to say, the basic concepts are embodied in each of the circuits shown. In each case a D. C. generator acts as a "horsepower transducer" to effectively multiply speed and torque of the motor. In the embodiment of Figures 1 and 2 the multiplicand thus obtained is merely applied to suitably calibrated indicating means in order to measure the power delivered to the load. In Figure 3 the multiplicand is applied to the grid circuit of the thyratron supplying D. C. voltage to the armature of the motor, in order to render the horsepower delivered by the motor to its load, a constant value determined by the setting of the selected reference voltage. The identical principle is employed in the circuit of Fig. 4, with the multiplicand controlling the field excitation of the generator supplying the motor in order to cause the motor to deliver constant horsepower to its load. The circuits shown in Figs. 3 and 4 each include in addition to the control circuit, suitably calibrated means to continuously indicate the horsepower delivered to the load.

From the foregoing, it will be apparent to those skilled in the art that there are herein shown and described novel circuits for deriving a voltage proportional to the horsepower delivered by a D. C. motor. In addition, specific utilizations of this voltage are shown in each of the figures of the drawing, as well as described in the foregoing specification. Obviously, these circuits will find wide application in a variety of industrial processes.

While several preferred embodiments of the invention have been herein shown and described, applicant claims the benefit of a full range of equivalents within the scope of the appended claims.

I claim:

1. An electronic circuit for controlling a D. C. motor from an A. C. source, comprising in combination: grid controlled gaseous rectifier means connected to supply D. C. voltage to the motor armature from an A. C. source; a D. C. generator; means mechanically coupling the shafts of the motor and generator so that the former drives the latter; means for immersing the motor armature in a magnetic field; a field winding for said generator connected in series between said rectifier and said motor armature; means for supplying the grid of said rectifier with an A. C. voltage substantially 90° out of phase with the anode voltage of the rectifier; a D. C. reference voltage; and means connecting between the grid and cathode of said rectifier, a voltage which is the resultant of the generator output voltage, the D. C. reference voltage and the phase shifted A. C. voltage, the said D. C. reference and generator output voltage being connected in opposed series relation.

2. An electronic circuit for controlling a D. C. motor from an A. C. source, comprising in combination: grid controlled gaseous rectifier means connected to supply D. C. voltage to the motor armature from an A. C. source; a D. C. generator; means mechanically coupling the shafts of the motor and generator so that the former drives the latter; means for immersing the motor armature in a magnetic field; a field winding for said generator connected in series between said rectifier and said motor armature; means for supplying the grid of said rectifier with an A. C. voltage substantially 90° out of phase with the anode voltage of the rectifier; a D. C. reference voltage; means connecting the positive side of the generator to the cathode of the rectifier; means connecting the negative side of the generator to the negative side of said D. C. reference voltage; and means connecting the positive side of the D. C. reference voltage to the grid of said rectifier in series with the phase shifted A. C. grid voltage.

3. A circuit as defined by claim 1, in which the D. C. reference voltage is adjustable to vary the base power output of the motor.

4. A circuit as defined by claim 2, in which the D. C. reference voltage is adjustable to vary the base power output of the motor.

5. An electronic circuit comprising in combination: a D. C. motor; a thyratron; a D. C. generator; means for connecting the thyratron, the armature of the motor and the field of the generator in a series circuit with an A. C. source; means for immersing the motor armature in a magnetic field; means mechanically linking the shafts of the motor and generator so that the former drives the latter; means for supplying the grid of said thyratron with an A. C. voltage substantially 90° out of phase with the A. C. source; a D. C. reference voltage; means connecting the negative side of the reference voltage to the negative side of the generator; means connecting the positive side of the reference voltage to the thyratron grid; and means connecting the positive side of the generator to the thyratron cathode.

6. Apparatus for controlling a D. C. motor to cause the motor to deliver constant horsepower under varying load conditions comprising: a D. C. motor; a D. C. generator; means for exciting the field winding of the generator with a current which is at all times proportional to the motor armature current; means mechanically interconnecting the motor and generator armatures; a source of variable D. C. voltage connected to the armature of the motor; means electrically interconnecting said variable source and the output of said generator whereby the voltage applied to the motor armature is a function of the generator output; and means for immersing the motor armature in a magnetic field.

7. Apparatus for so controlling a D. C. motor that it delivers constant horsepower under varying motor loads comprising: an A. C.-D. C. motor generator set; a D. C. motor; a D. C. tachometer generator; means mechanically interconnecting the armatures of said motor and said tachometer generator; means mechanically connecting the armature of said motor to the armature of said D. C. generator; means for exciting the field winding of said tachometer generator with a current which is proportional to the armature current of said motor; means for immersing the armature of said motor in a magnetic field; grid controlled gaseous rectifier means connected to supply a direct current voltage to the field winding of the generator of the motor generator set from an A. C. source; a D. C. reference voltage; means for supplying the grid of said gaseous rectifier means with an A. C. voltage substantially 90° out of phase with the anode voltage; means connecting the positive side of the tachometer generator output to the cathode of said gaseous rectifier means; and means connecting the negative side of the tachometer generator to the negative side of said reference voltage; and means connecting the positive side of said reference voltage to the grid of said gaseous rectifier in series with the phase shifted A. C. grid voltage.

8. Apparatus as defined by claim 7 and including power indicating means connected to the output of said tachometer generator.

References Cited in the file of this patent

UNITED STATES PATENTS

| 1,709,674 | Kuhl | Apr. 16, 1929 |
| 2,474,872 | Tustin | July 5, 1949 |
| 2,600,303 | Kovalsky | June 10, 1952 |
| 2,688,114 | Wheeler | Aug. 31, 1954 |

FOREIGN PATENTS

| 640,942 | France | Apr. 7, 1928 |